United States Patent Office 2,764,381
Patented Sept. 25, 1956

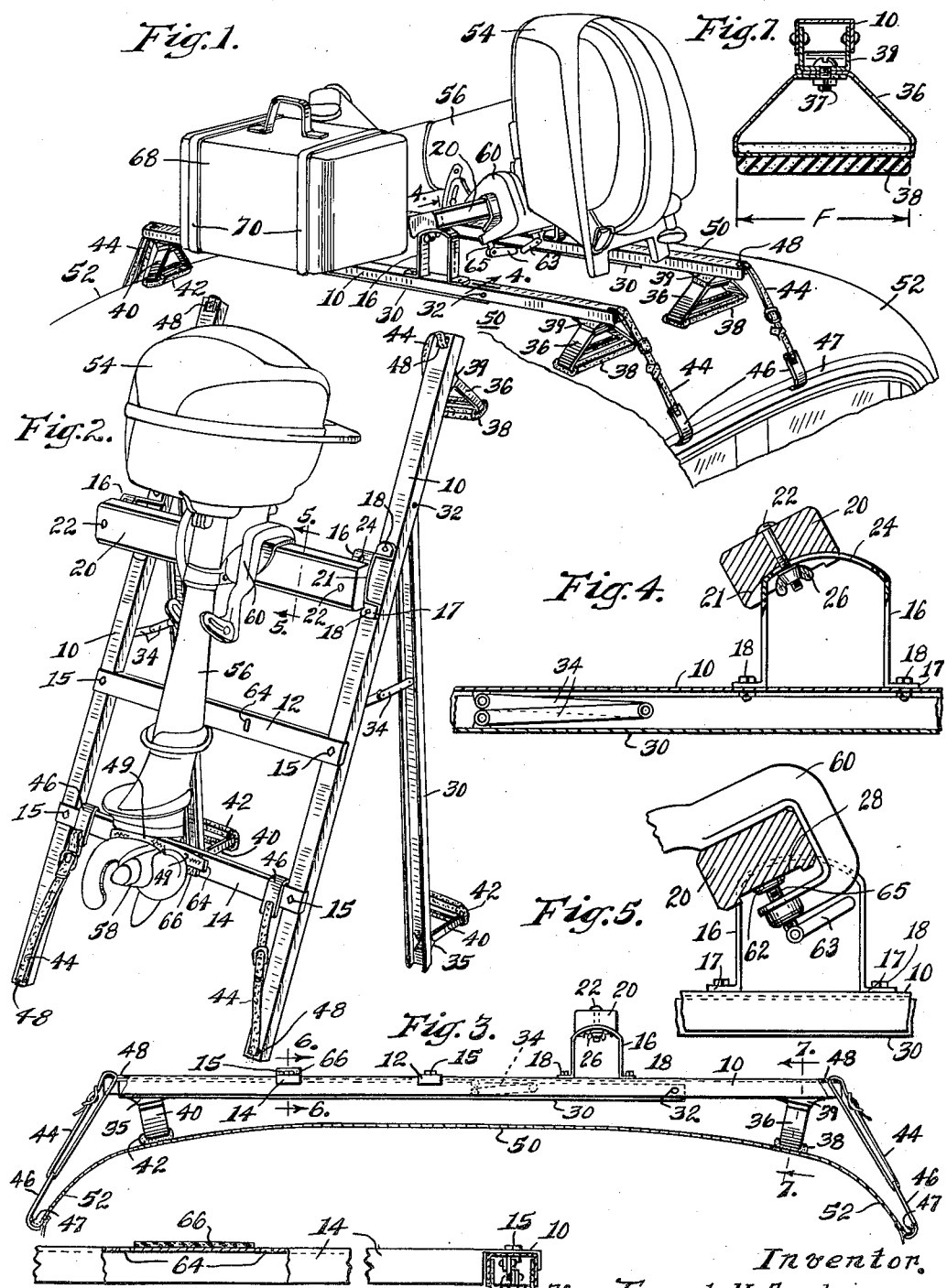

2,764,381

CARRIER FOR OUTBOARD MOTORS

Frank H. Anderson, Des Moines, Iowa, assignor to New Monarch Machine and Stamping Company, Des Moines, Iowa, a corporation of Iowa Application January 19, 1952, Serial No. 267,274

2 Claims. (Cl. 248—195)

My present invention has to do with a carrier adapted for mounting on an automobile top, the carrier being particularly designed for outboard motors although it is also adaptable for carrying canoes, luggage, etc.

One object of the invention is to provide a carrier of the general character disclosed, which may also be used as a stand or as a wall-hung mounting rack for an outboard motor when the carrier is removed from an automobile top.

Another object is to provide a carrier which is rugged in construction yet light in weight and which is adaptable for many uses in addition to serving as a carrier and stand for an outboard motor.

Still another object is to provide a carrier which may be mounted on the top of an automobile and to which an outboard motor may be clamped which carrier may also take care of a gasoline can for the motor, thus eliminating the necessity of carrying the motor in the trunk of the automobile and eliminating oil drippings and oil and gasoline odors in the trunk.

A further object is to provide a combination carrier and stand so that a frame, after serving as a carrier on the top of an automobile, may be opened up to serve as an easel-like stand which is the proper way to store a motor, or the frame of the carrier may be suspended on the wall of a garage or the like if desirable with the motor attached.

Still a further object is to provide a carrier for an outboard motor which carries the motor crosswise of the automobile with the weight thereof suspended on the top adjacent the radii of the side edges thereof, thus giving ample strength for large motors as distinguished from those carriers that are mounted on the relatively flat center panel portion of the automobile top, and, by the removal of four bolts, permits two sections of the carrier to be spaced apart on the automobile top to serve as an emergency carried for elongated items.

An additional object is to provide a carrier which includes a bar for coaction with the mounting clamps of an outboard motor, which bar is adjustable as to inclination relative to the plane of the frame structure that forms the carrier, thus providing added convenience when mounting a specific outboard motor thereon.

With these and other objects in view, my invention consists in the construction, arrangement and combination of the various parts of my automobile top mounted carrier, whereby the objects contemplated are attained, as hereinafter more fully set forth, pointed out in my claims and illustrated in the accompanying drawings, wherein:

Figure 1 is a perspective view of an automobile top mounted carrier embodying my present invention showing it associated with the top of an automobile and showing an outboard motor and a gasoline tank therefor carried by the carrier.

Figure 2 is a perspective view of the carrier and the outboard motor with legs of the carrier opened to form a stand for the outboard motor in an upright position.

Figure 3 is a transverse sectional view through the top of a automobile with my carrier mounted thereon.

Figure 4 is an enlarged sectional view on the line 4—4 of Figure 1 to show the adjustment of the inclination of a bar for supporting the outboard motor.

Figure 5 is a similarly enlarged view on the line 5—5 of Figure 2.

Figure 6 is an enlarged sectional view on the line 6—6 of Figure 3 to show further details of construction; and Figure 7 is an enlarged sectional view on the line 7—7 of Figure 3.

On the accompanying drawing I have used the reference numeral 10 to indicate a channel-shaped frame member. Two of the members 10 are provided and they may be made of aluminum alloy, steel or the like. A pair of cross bars 12 and 14 are connected by removable bolts 15 with the frame elements 10 to provide a frame structure. Also brackets 16 and a supporting bar 20 for the outboard motor connect the frame members 10 together to form part of the frame structure. The cross bars 12 and 14 may also be made of channel-shaped material.

The brackets 16 are removably mounted on the frame members 10 by means of bolts 18. The brackets are U-shaped, and curved on their outer surfaces as shown in Figure 4. The supporting bar 20 has a similar curvature 21 to interfit therewith. The bar 20 may be of suitable hard wood of about 2" x 4" size and is secured to the brackets 16 preferably by bolts 22 and wing nuts 26, the bolts extending through slots 24 in the curved portions of the brackets. This permits adjustment of the angle of the supporting bar 20 relative to the plane of the frame 10—12—14 as will be obvious by comparing Figure 4 with Figure 3.

A channel-shaped leg 30 is pivoted to each frame member 10 at 32 and is adapted to collapse thereinto as shown in Figure 3 or to be extended therefrom as in Figure 2 for a purpose which will hereinafter appear. Folding links 34 are provided for holding the legs 30 in the extended position shown in Figure 2.

Spacers 36 are provided at the upper ends of the frame members 10 in Figure 2 and similar spacers 40 are provided at the lower ends of the legs 30 as shown. The lower ends of these spacers as shown in Figure 3 are provided with resilient pads 38 and 42 respectively for contact with the top of the automobile to prevent marring thereof.

The carrier further includes straps 44 and hooks 46 for mounting the carrier on the automobile top, the straps extending through slots 48 in the upper and lower ends of the frame members 10 in Figure 2. The manner of mounting is shown in Figures 1 and 3, the hooks 46 extending under the rain gutters 47 usually provided along the sides of the automobile top 50 just above the doors and windows thereof. The top 50 is usually substantially flat in the center, and adjacent its edges is curved with the radius shown at 52. It will be noted that the spacers 36 and 40 are positioned for coaction with these radii, thus providing support at a comparatively strong portion of the automobile top; whereas the relatively flat central panel portion 50 is not as well braced and is subject to vibration. Thus I provide an arrangement that is relatively solid as a mounting means for even large size outboard motors.

The outboard motor is shown in general at 54. It includes a propeller shaft tube 56, a propeller 58 on the lower end thereof and C clamp members 60 adjacent the motor which are usually adjustable relative to the propeller shaft housing 56 for mounting it at the proper angle at the back of boats which have sterns of various inclination. Once the motor is adjusted for a particular boat, it is desirable to leave it adjusted in that manner.

The C clamps 60 include clamping screws 65 and handles 63 as shown in Figure 5. Pads 62 on the screws may be tightened into a groove 28 formed longitudinally on the under surface of the supporting bar 20 which groove insures that the clamps will not be dislodged even though the screws 65 are somewhat loose.

The mounting arrangement for the supporting bar 20 relative to the brackets 16 as shown in Figure 4 permits adjustment of the bar 20 to the same angle as the C clamp 60 when the lower end of the propeller shaft housing 56 is strapped as at 49 to the cross bar 14. This cross bar is provided with slots 64 for the strap 49 and with a pad 66 of suitable resilient material to prevent damage to the propeller shaft housing 56 when it is strapped in position.

The cross bar 12 may also be provided with slots 64, and a gasoline tank 68 for the outboard motor 54 may be mounted on the bars 12 and 14 while the carrier is in transit by means of straps 70, if desired, as shown in Figure 1.

From the foregoing specification, it will be obvious that I have provided a carrier that can be mounted on the top of an automobile to rigidly support an outboard motor in relation thereto. The carrier is particularly designed for outboard motors and permits adjustment of the angle of the supporting bar 20 so that the carrier can be adapted for use with the particular outboard motor being carried.

When it is desirable to store the motor, the carrier may be opened up to serve as an easel-like stand for the motor (as shown in Figure 2), and thus support the motor in the desired position for storage. Alternatively, the legs 30 may be left in the collapsed position and the spacers 36 engaged with a support on the wall of a garage or the like in order to hang the carrier and the motor on the wall.

By the removal of the four bolts 18, it is possible to provide a suitable carrier for commodities other than outboard motors. The resulting frame structure 10—12—14 may be used for supporting luggage, a box for containing various articles or for other supporting purposes with respect to the top of the automobile.

Also if desired the bolts 15 can be removed to disconnect the bars 12 and 14 so that the frame members 10 can be spaced farther apart such as adjacent the front and rear of the automobile top and thus accommodate elongated items such as canoes and tent poles. When used in this manner the relatively wide footing afforded by the spacers 36 as illustrated at F in Figure 7 prevents the members 10 from tipping forwardly or rearwardly when the bars 12 and 14 are omitted. The combination carrier and stand has much obvious utility and fills a definite need of sportsmen and the like.

Some changes may be made in the construction and arrangement of the parts of my automobile top mounted carrier without departing from the real spirit and purpose of my invention, and it is my intention to cover by my claims any modified forms of structure or use of mechanical equivalents which may be reasonably included within their scope.

I claim as my invention:

1. In a carrier of the character disclosed, a frame structure including side bars, and means for securing an outboard motor to said frame structure, said means including a bracket on each of said side bars having a curved outer face, and a bar for reception in the mounting clamps of said motor, said bar having curved surfaces engaging said brackets, an elongated slot in each of said brackets, clamp bolt means extended through said bar and said slot adjustably securing said bar to said brackets, said bar having longitudinal groove to receive the mounting clamps of the motor, and a second bar on said frame to which the propeller shaft housing of said motor may be secured.

2. In a carrier of the character disclosed, a frame structure, and means for securing an outboard motor to said frame structure, said means including a pair of brackets having curved outer faces and a bar for reception in the mounting clamps of said motor, said bar having curved surfaces engaging said brackets, an elongated slot in each of said brackets, clamp bolt means extended through said bar and said slot securing said bar at different positions on said brackets, and a second bar on said frame to which the propeller shaft housing of said motor is adapted to be secured.

References Cited in the file of this patent

UNITED STATES PATENTS

| | | |
|---|---|---|
| 1,601,997 | Coss | Oct. 5, 1926 |
| 1,733,479 | White | Oct. 29, 1929 |
| 1,790,711 | Johnston | Feb. 3, 1931 |
| 1,826,843 | Thomas | Oct. 13, 1931 |
| 2,231,277 | Mepham | Feb. 11, 1941 |
| 2,266,683 | Berglund | Dec. 16, 1941 |
| 2,268,958 | Parten et al. | Jan. 6, 1942 |
| 2,436,228 | Purchase | Feb. 17, 1948 |
| 2,515,428 | Scott et al. | July 18, 1950 |
| 2,615,619 | Andersen | Oct. 28, 1952 |
| 2,646,237 | Hinesman | July 15, 1953 |
| 2,658,703 | Brink et al. | Nov. 10, 1953 |